United States Patent
Han et al.

(10) Patent No.: US 7,403,351 B1
(45) Date of Patent: Jul. 22, 2008

(54) SEQUENCE-PERMUTATION CONTROL INFORMATION DETECTION AND SIGNAL POLARITY DETERMINATION

(75) Inventors: Ke Han, Fremont, CA (US); Zining Wu, Los Altos, CA (US)

(73) Assignee: Marvell International, Ltd., Hamilton (BM)

( * ) Notice: Subject to any disclaimer, the term of this patent is extended or adjusted under 35 U.S.C. 154(b) by 404 days.

(21) Appl. No.: 10/944,506

(22) Filed: Sep. 17, 2004

Related U.S. Application Data

(60) Provisional application No. 60/571,073, filed on May 14, 2004.

(51) Int. Cl.
*G11B 5/09* (2006.01)
(52) U.S. Cl. ...................................... 360/46
(58) Field of Classification Search ............... None
See application file for complete search history.

(56) References Cited

U.S. PATENT DOCUMENTS 5,668,678 A 9/1997 Reed et al.
5,963,387 A 10/1999 Son
6,657,802 B1 * 12/2003 Ashley et al. ............... 360/51
2003/0055572 A1 * 3/2003 Kuki et al. ................. 702/26

* cited by examiner

*Primary Examiner*—Andrea Wellington
*Assistant Examiner*—Dan I Davidson

(57) ABSTRACT

Systems and techniques relating to interpreting signals on a noisy channel with polarity uncertainty. A signal processor, such as a read channel transceiver device usable in a magnetic recording system, includes a detector operable to find a data pattern that indicates control information in a read signal and to determine a signal polarity of the read signal by determining Euclidean distances between a sampled sequence from the read signal and multiple possible sequences corresponding to preamble-shifted and polarity-reversed versions of the data pattern. The read signal is obtained from a partial response channel, such as in a storage device, and the data pattern can be a servo mark selected based on Euclidean distances between the servo mark and preamble-shifted and polarity-reversed versions of the servo mark generated according to a target channel and an encoding scheme specified for the storage medium.

30 Claims, 4 Drawing Sheets

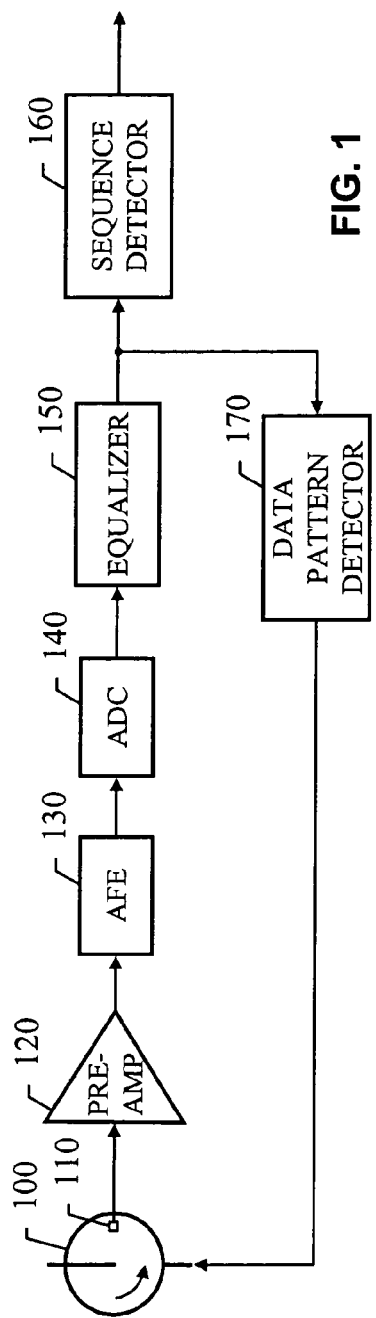
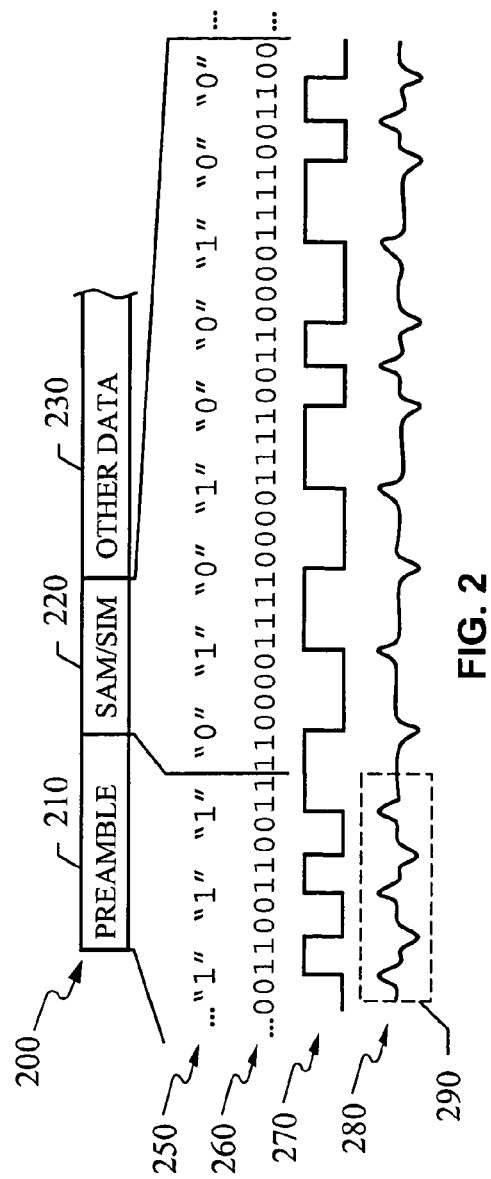

SEQUENCE-PERMUTATION CONTROL INFORMATION DETECTION AND SIGNAL POLARITY DETERMINATION

CROSS REFERENCE TO RELATED APPLICATIONS

This application claims the benefit of the priority of U.S. Provisional Application Ser. No. 60/571,073, filed May 14, 2004 and entitled "Optimal SIM and SAM Design and Detection with Polarity Uncertainty".

TECHNICAL FIELD

The present disclosure describes systems and techniques relating to signal processing, for example, interpreting read signals obtained from a magnetic storage medium to find a servo address mark (SAM).

BACKGROUND

Signal processing circuits are frequently used to read storage media and interpret obtained analog signals as discrete values stored on the media. For magnetic storage media, a transducer head may fly on a cushion of air over a magnetic disk surface. The transducer converts magnetic field variations into an analog electrical signal. The analog signal is amplified, converted to a digital signal and interpreted (e.g., using maximum likelihood techniques, such as using a Viterbi detector). Tracking of stored data during a read operation is frequently performed using feedback or decision aided gain and timing control. Moreover, a closed-loop servo system, driven by servo control information embedded in a dedicated portion of every track of the recording surface, is used to accurately position the head and follow the track.

The servo control information defines the position of the data tracks. Typically, the servo control information is written on each surface as a radially extending set of spokes or wedges. The servo information typically includes a servo index mark (SIM) used as a reference point for counting sectors in a track. The servo information also typically includes, in a servo wedge at a track, a preamble used for timing recovery and data framing, a servo address mark (SAM) used for detecting the beginning of a valid servo field, and a track number code, which is typically Gray coded data corresponding to the current track and current wedge. The servo control information can also include two or more fine-positioned offset bursts configured in an echelon across the track.

SUMMARY

The present disclosure includes systems and techniques relating to interpreting signals on a noisy channel with polarity uncertainty. According to an aspect of the described systems and techniques, a signal processor, such as a read channel transceiver device usable in a magnetic recording system, includes a detector operable to find a data pattern that indicates control information in a readback signal and to determine a signal polarity of the readback signal by determining Euclidean distances between a sampled sequence from the readback signal and multiple possible sequences corresponding to preamble-shifted and polarity-reversed versions of the data pattern. The readback signal is obtained from a partial response channel, such as in a storage device, and the data pattern can be a servo mark (e.g., a servo address mark or a servo index mark) selected based on Euclidean distances between the servo mark and preamble-shifted and polarity-reversed versions of the servo mark generated according to a target channel and an encoding scheme specified for the storage medium. (A data portion of the readback signal can also include the Gray coded track and wedge information.)

According to another aspect of the described systems and techniques, creating a servo mark can involve producing symbol sequences of a given length. For each symbol sequence, readback waveforms of preamble-shifted and polarity-reversed versions of the symbol sequence are generated based on a target channel and an encoding scheme specified for a storage medium; and for each symbol sequence, the minimum of the Euclidean distances between the generated readback waveforms and a readback waveform of the symbol sequence is determined. The symbol sequence having a largest of the determined minimum values is then selected as the servo mark for the storage medium.

The storage medium can include a magnetic storage medium, and the encoding scheme can include a 1/N rate Manchester code, N being an integer greater than or equal to 2. The servo mark can include a servo address mark. Operations performed can include deciding a servo index mark based on the servo address mark, and based on preamble-shifted and polarity-reversed versions of possible symbol sequences for the servo index mark. The servo index mark and the servo address mark can both have a given length, and deciding the servo index mark can include, for each of the produced symbol sequences, excluding the selected servo address mark symbol sequence, ascertaining a minimum value of Euclidean distances between the readback waveform of the produced symbol sequence and the generated, pre-amble-shifted and polarity-reversed readback waveforms for both the produced symbol sequence under consideration and the selected servo address mark symbol sequence; and selecting one of the produced symbol sequences, excluding the selected servo address mark symbol sequence, having a largest of the ascertained minimum values as the servo index mark.

The described systems and techniques can be implemented using a computer-readable medium encoded with a software program, apparatus or combinations thereof, and can result in accurate detection of SAM and SIM when there is polarity uncertainty in the readback signal. The polarity of the readback signal waveform may be unknown when it comes time to find SAM or SIM. For example, a new read operation can require a new stimulating current for the read head, which can impart a random polarity to the readback signal in a disk drive. The described systems and techniques can tolerate this polarity uncertainty, find SIM and SAM at the proper locations, and determine the signal polarity of the readback signal. Moreover, the probability of early detection of SAM and SIM can be minimized.

Details of one or more implementations are set forth in the accompanying drawings and the description below. Other features, objects and advantages may be apparent from the description and drawings, and from the claims.

DRAWING DESCRIPTIONS

FIG. 1 is a block diagram showing a read channel in a storage system that employs sequence-permutation control information detection and signal polarity determination.

FIG. 2 illustrates the contents of a portion of a track of a recording surface.

Like reference symbols in the various drawings indicate like elements.

DETAILED DESCRIPTION

Figure 3:
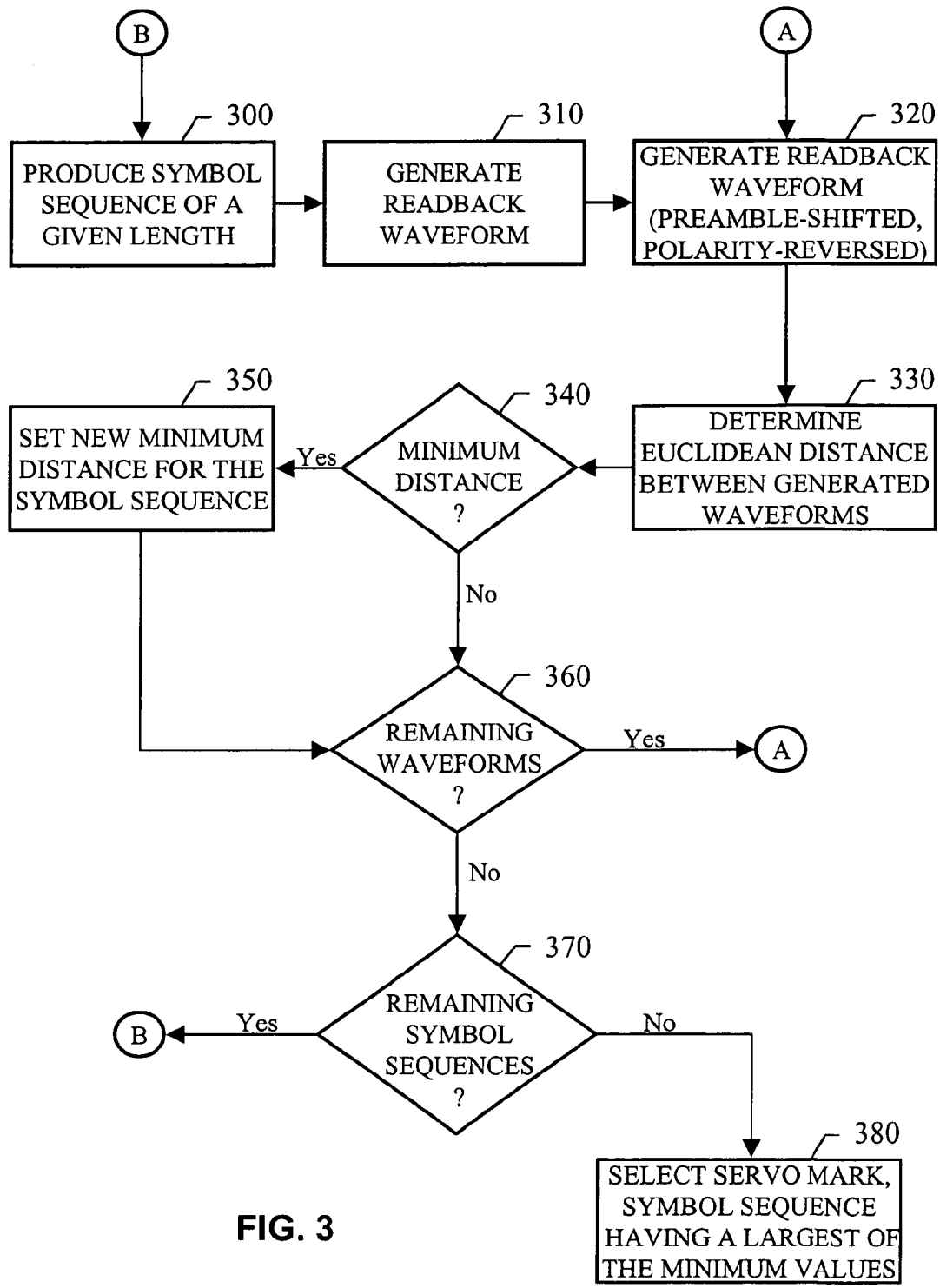
FIG. 3 is a flowchart showing a process of creating a servo mark data pattern.

FIG. 1 is a block diagram showing a read channel in a storage system that employs sequence-permutation control information detection and signal polarity determination. The storage system includes a storage medium 100 and read head 110. The storage medium can be read-only or read/write media and can be magnetic-based, optical-based, semiconductor-based media, or a combination of these. Examples of the storage medium include hard disk platters in a hard disk drive, a floppy disk, a tape, and an optical disk (e.g., laser disk, compact disk, digital versatile disk). The storage medium is depicted in FIG. 1 as a disk for illustration only; the systems and techniques described herein can be used with other storage media types or in non-storage applications (e.g., communications equipment).

The read head 110 can be part of a read-write head assembly that reads the storage media 100 under the control of a servo or actuator. An analog readback signal is generated and can be sent to a pre-amplifier 120. The system can include an analog front end (AFE) 130, which can provide filtering and gain control. The AFE 130 can receive input from an automatic gain control (AGC) unit. The AFE 130 can include a variable-gain amplifier (VGA), which can be regulated by the AGC, and an analog equalizer, such as a continuous time filter (CTF).

An analog to digital converter (ADC) 140 converts the readback signal into discrete-time samples, and a discrete-time signal equalizer 150 shapes the signal to a desired target. The ADC 140 can be a 6-bit ADC. The signal equalizer 150 can be a finite impulse response (FIR) digital filter, such as a 9-tap FIR, which can be programmable or adaptive.

A sequence detector 160 can be a discrete time sequence detector that interprets its input as discrete values stored on the media 100. Timing control circuitry, such as a timing control unit and/or a phase locked loop (PLL), can be used to regulate the filtered signal provided to the detector 160, and DC (direct current) correction can be applied at one or more locations in the main read path. The main read path can combine partial-response equalization with maximum-likelihood sequence detection (PRML), using either a discrete-time approach and/or a continuous-time approach (e.g., the class-IV partial response target (PR-IV)). The sequence detector 160 can be a Viterbi detector.

A data pattern detector 170 receives the readback signal. The detector 170 is operable to find a data pattern that indicates control information in the readback signal and to determine a signal polarity of the readback signal by determining Euclidean distances between a sampled sequence from the readback signal and multiple possible sequences corresponding to preamble-shifted and polarity-reversed versions of the data pattern. For example, the data pattern can be a servo mark, such as a servo address mark (SAM) or a servo index mark (SIM), selected based on Euclidean distances between the servo mark and preamble-shifted and polarity-reversed versions of the servo mark. The data pattern detector 170 can be part of a servo controller and/or part of a read/write channel circuit.

FIG. 2 illustrates the contents of a portion 200 of a track of a recording surface. The track portion 200 includes a preamble 210, a SAM/SIM 220, and other data 230, which can include Gray coded data. The preamble 210 is a symbol sequence that can be used for timing recovery and data framing. The preamble 210 can be a sequence of "1" symbols, and the SAM/SIM 220 can be a selected pattern of "0" and "1" symbols (e.g., nine symbols, such as the symbol sequence 010100100). Only SAM will be discussed below, but the systems and techniques described are applicable to SIM and other control information data patterns as well. The other data 230 can include many different patterns of data describing different types of information (e.g., the index of a particular track), but can generally be thought of as a random set of "0" and "1" symbols for the purposes of this description.

The symbols in the track portion 200 can be coded using a rate ¼ Manchester coding in the target channel. For example, the symbols can be coded according to the following rules: a "1" symbol is mapped to "0011", and a "0" symbol is mapped to "1100". Thus, there is only one bit of information for every four channel bits. To reliably detect the underlying symbols from a sampled sequence, the sampled sequence should be correctly framed into groups of four samples so that each group of four samples is truly correlated to one particular symbol.

A symbol sequence 250 shows an example of a tail end of the preamble 210 (the last three "1" symbols of the preamble) and the SAM 220 (all nine symbols of this example SAM). A corresponding rate ¼ encoded sequence of channel bits 260 is shown just below the symbol sequence 250. A digital waveform 270 illustrates the positive and negative transitions used in writing the encoded sequence 260 to a storage medium. An analog waveform 280 illustrates the corresponding signal obtained by reading the track. As shown, a positive transition in the binary waveform results in a positive pulse in the readback signal, and a negative transition in the binary waveform results in a negative pulse in the readback signal.

As shown, the preamble 210 generates a generally sinusoidal waveform 290, which can be used to frame the sampled sequence. The bit pattern of the preamble is the following sequence: [0, 0, 1, 1, 0, 0, 1, 1, 0, 0, 1, 1, . . . , 0, 0, 1, 1]. If the target is [1, 0, −2, 0, 1], then the sampled preamble waveform is given by [x, x, x, x, −2, −2, +2, +2, −2, −2, +2, +2, . . . , −2, −2, +2, +2] and the framing of the preamble samples is [x, x, x, x|−2, −2, +2, +2|−2, −2, +2, +2| . . . |−2, −2, +2, +2]. Sampling of the readback signal can be based on this signal-indicated framing.

The polarity uncertainty is not seen in the preamble waveform 290 because a flipped sin wave is still a sin wave. With a reversed polarity, if the framing is still decided by the preamble samples in the manner described above, the framing would be off by two channel bits or two channel clock cycles. The correct framing in this case can be derived by shifting the above framing (decided by the preamble samples) by two bits. By creating a servo mark based on Euclidean distances between the servo mark and preamble-shifted and polarity-reversed versions of the servo mark generated according to a target channel and an encoding scheme specified for the storage medium, the servo mark can be accurately found in the track portion 200 and the signal polarity can be determined concurrently.

FIG. 3 is a flowchart showing a process of creating a servo mark data pattern. Symbol sequences of a given length are produced at 300. SAM data patterns are generally short enough (e.g., 9 symbols long) that an exhaustive search to find the servo mark pattern that has the best property in Euclidean distance between its preamble-shifted and polarity-reversed versions and itself does not require excessive time. Because polarity uncertainty is to be tolerated in the readback waveform, the search for the best SAM uses a criterion that also considers the distances between SAM and its flipped (polarity reversed) and shifted versions.

For each symbol sequence produced during the search, a readback waveform for the symbol sequence is generated based on a target channel and an encoding scheme specified for a storage medium at 310. Readback waveforms of preamble-shifted and polarity-reversed versions of the symbol sequence are then generated based on the target channel and the encoding scheme at 320. For each preamble-shifted, polarity-reversed waveform, a Euclidean distance between this waveform and that for the symbol sequence is determined at 330. If this distance is the minimum found for this symbol sequence at 340, then this new minimum distance is saved for the symbol sequence at 350.

While additional preamble-shifted, polarity-reversed waveforms remain to be analyzed at 360, control passes through circle-A to 320, and these waveforms continue to be generated and compared. Then, while additional symbol sequences remain to be analyzed at 370, control passes through circle-B to 300, and these symbol sequences are produced and checked as described above. Once the symbol sequences have been checked, the symbol sequence having a largest of the determined minimum values is selected to be the servo mark at 380.

Figure 6:
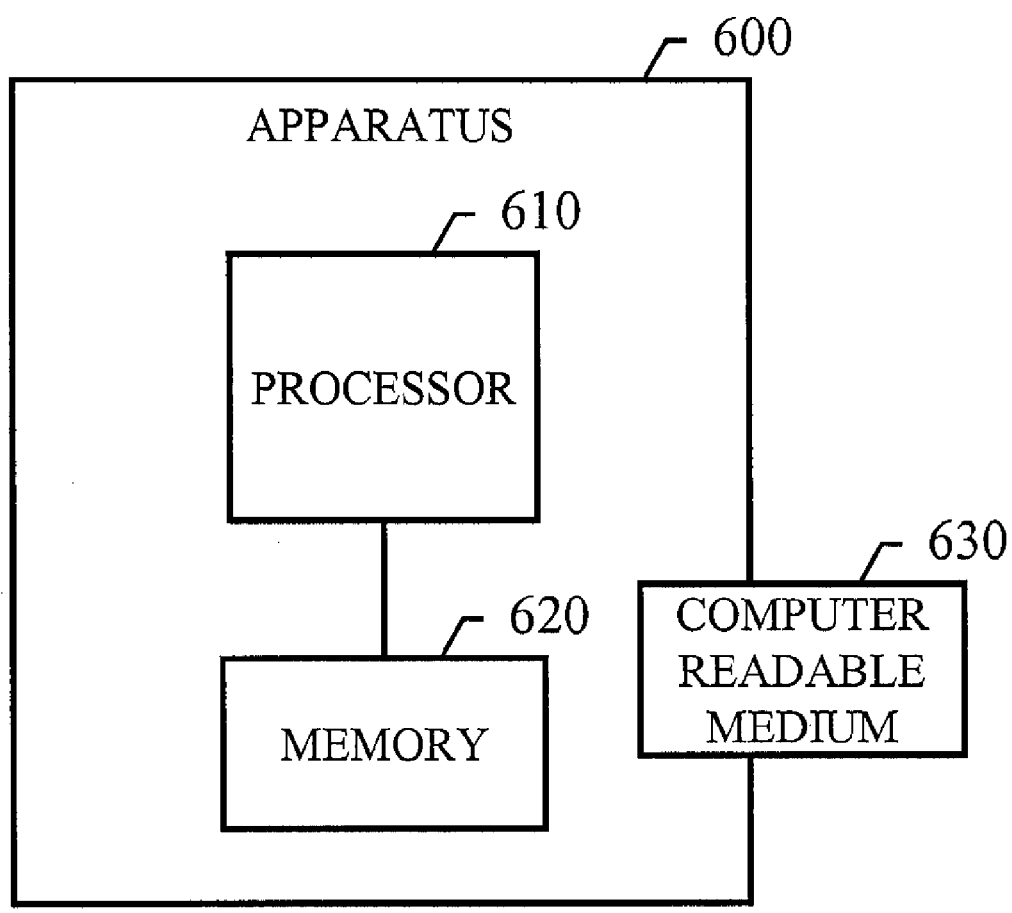
FIG. 6 is a block diagram showing a computing apparatus and computer-readable medium.

The process depicted in FIG. 3 can be implemented, as shown in FIG. 6, using an apparatus 600 that includes a processor 610 and a memory 620 arranged and configured to cause the processor to perform the operations described. The process can also be implemented using a computer-readable medium 630 encoded with a software program operable to cause one or more machines to perform the operations described. Moreover, the process depicted in FIG. 3 does not require the particular order shown, sequential order, or that all operations illustrated be performed, to achieve desirable results. In general, the process of creating a nine symbol SAM can be understood as follows. Let the SAM be denoted by $S=[s_0 \, s_1 \ldots s_8]$, and the preamble by $P=[1 \, 1 \ldots 1]$. Then the right-shifted versions of SAM can be denoted by $S_i=[1 \ldots 1 \, s_0 \ldots s_{8-i}]$, where $i=0, 1, 2, \ldots, 9$. Thus, $S_0$ corresponds to SAM itself, and $S_9$ corresponds to the all-one preamble pattern. To denote the flipped and shifted version of SAM, $\overline{S}_i$ is used, where $\overline{S}_i$ is the flipped version of $S_i$.

A target for the equalized channel can be specified (e.g., [1, 0, -2, 0, 1]) in order to generate the readback waveforms. Let $W_i$ and $\overline{W}_i$ be the waveforms generated by $S_i$ and $\overline{S}_i$, respectively. The SAM pattern optimization is to find the pattern S, out of the possible candidates (e.g., $2^9=512$ possible candidates for a SAM of length 9), that maximizes a quantity, $\min\{dis(W,W_1), \ldots dis(W,W_9), dis(W,\overline{W}_0), dis(W,\overline{W}_1), \ldots dis(W,\overline{W}_9)\}$, where dis( ) is the Euclidean distance between the two arguments. This same pattern, S, can also maximize the quantity, $\min\{dis(\overline{W}, \overline{W}_1), \ldots dis(\overline{W},\overline{W}_9), dis(\overline{W},W_0), dis(\overline{W},W_1) \ldots dis(\overline{W}, W_9)\}$.

This approach to creating servo marks to be used with a particular storage medium based on the partial response channel can minimize the probability of early detection of the servo mark; detecting a servo mark at a place earlier than it actually is located is a typical type of mis-detection. Such mis-detection is minimized by maximizing the Euclidean distances between the waveforms generated by the servo mark and the waveforms generated by the right-shifted and flipped versions of the servo mark, in which the preamble symbols are shifted in from the left and the servo mark symbols are shifted out at the right (see FIG. 2).

For detection of the SAM in an operating storage device, the framing can involve grouping the samples of the readback waveform into segments of four according to the underlying symbols, and this framing can be established from the preamble as discussed above. The SAM detector can take a snap shot of the waveform, 36 samples long, every symbol interval (4 channel clock cycles) and compare the snap shot with all the possible waveform patterns.

If the snap shot of the waveform is denoted by V, the following distances can be calculated for each symbol interval: $\{dis(V,W_0), \ldots dis(V,W_9), dis(V,\overline{W}_0), dis(V,\overline{W}_1) \ldots dis(V,\overline{W}_9)\}$. If V is the closest to $W_0$, SAM is found and the signal polarity is determined to be positive. If V is closest to $\overline{W}_0$, SAM is found and the signal polarity is determined to be negative. Otherwise, SAM is not found.

Figure 4:
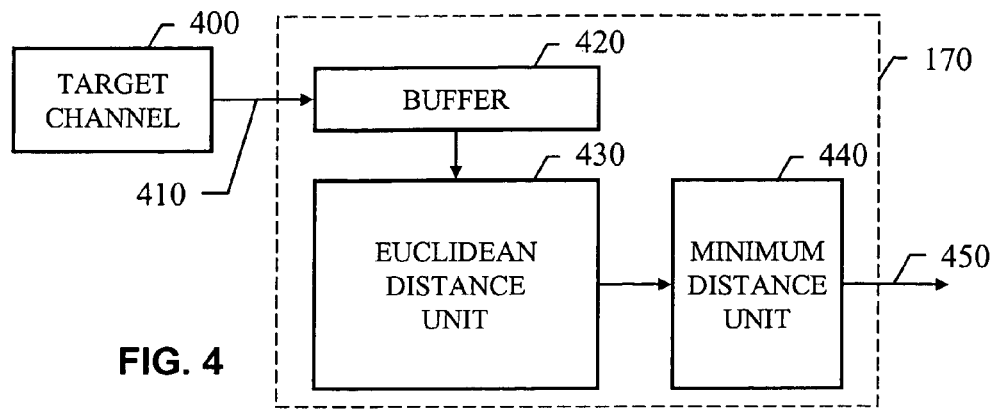
FIG. 4 is a block diagram showing an example data detector that employs sequence-permutation control information detection and signal polarity determination.

FIG. 4 is a block diagram showing an example data detector 170 that employs sequence-permutation control information detection and signal polarity determination. A readback signal is obtained from a target channel 400. The readback signal has an initially unknown polarity, but framing circuitry (not shown) can still be used to generate an initial framing based on the signal (e.g., based on a generally sinusoidal portion of the readback waveform). Based on this signal-indicated framing, samples 410 are provided to the detector 170.

A buffer 420 retains the sampled sequence from the target channel 400. As each new set of samples 410 comes in, they are stored in the buffer 420, and the oldest set of samples can be eliminated (e.g., each successive vector for comparison can be generated by shifting out the four oldest samples and shifting in the four newest samples). A Euclidean distance unit 430 compares the sampled sequence from the buffer 420 with the known possible sequences to generate Euclidean distance values (e.g., 20 distance values are calculated for a SAM that is 9 symbols in length). A minimum distance unit 440 finds the data pattern and determines the signal polarity, based on the Euclidean distance values from the Euclidean distance unit 430, and generates output 450 that indicates both the found data pattern and the determined signal polarity.

The minimum distance unit 440 can check to see if the minimum distance measure corresponds to either the comparison with $W_0$ or the comparison with $\overline{W}_0$, as described above. Additionally, the minimum distance unit 440 can check to see if the minimum distance measure corresponds to any of the other comparisons performed in the Euclidean distance unit 430. For example, the minimum distance unit 440 can track progression of minimum Euclidean distance values through output of the Euclidean distance unit 430; knowing that the current minimum distance measured corresponds to the comparison with $W_0$, and that the last minimum distance measured corresponded to the comparison with $W_1$ can be used to improve the accuracy of the detector 170.

Figure 5:
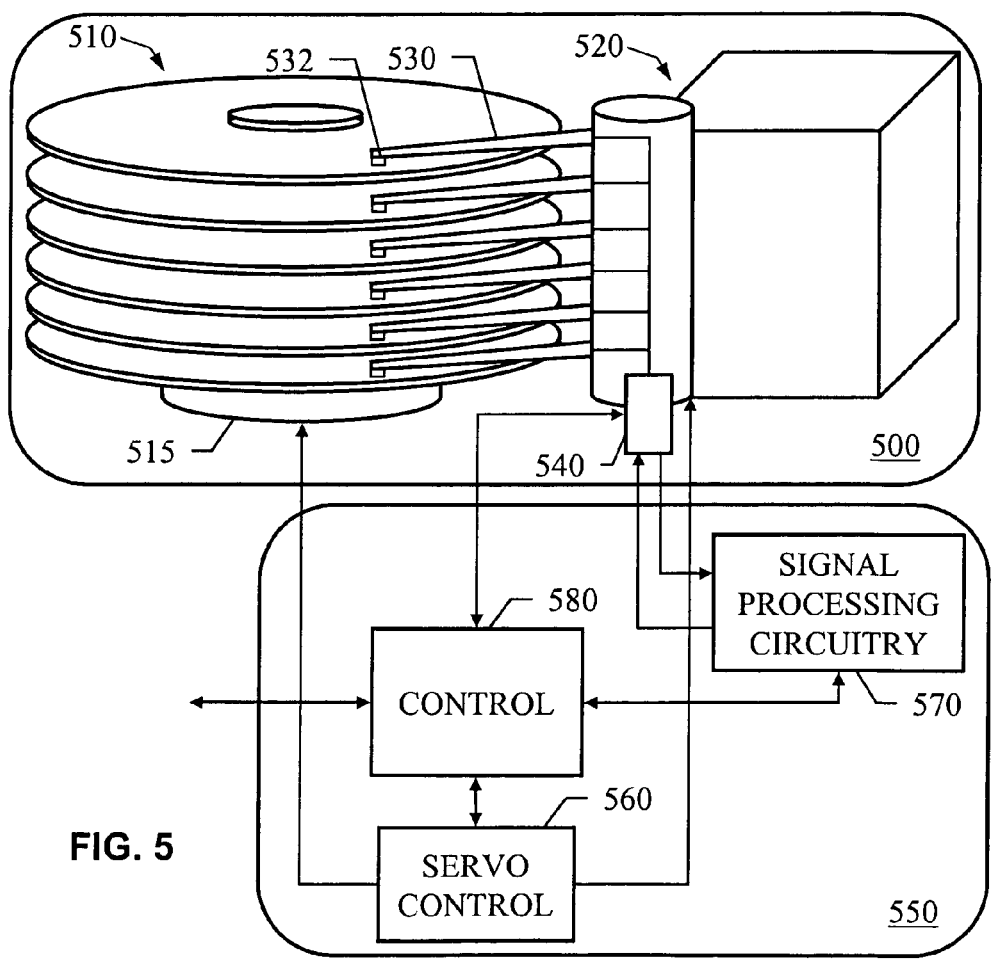
FIG. 5 is a block diagram showing a magnetic-media disk drive that employs sequence-permutation control information detection and signal polarity determination.

The signal processor components described can be implemented as one or more devices, such as one or more integrated circuit (IC) devices, in a storage device. FIG. 5 is a block diagram showing a magnetic-media disk drive that employs sequence-permutation control information detection and signal polarity determination as described. The disk drive includes a head-disk assembly (HDA) 500 and drive electronics 550 (e.g., a printed circuit board (PCB) with semiconductor devices). The HDA 500 includes one or more disks 510 mounted on an integrated spindle and motor assembly 515.

The spindle and motor assembly 515 rotates the disk(s) 510 under read-write head(s) connected with a head assembly 520 in the HDA 500. The disk(s) 510 can be coated with a magnetically hard material (e.g., a particulate surface or a thin-film surface) and can be written to, or read from, a single side or both sides of each disk.

A head 532 on an arm 530 can be positioned as needed to read data on the disk. A motor (e.g., a voice coil motor or a stepper motor) can be used to position the head over a desired track. The arm 530 can be a pivoting or sliding arm and can be spring-loaded to maintain a proper flying height for the head 532 in any drive orientation. A closed-loop head positioning system can be used.

The HDA 500 can include a read-write chip 540, where head selection and sense current value(s) can be set. The read-write chip 540 can amplify a readback signal before outputting it to signal processing circuitry 570. The signal processing circuitry 570 can include a readback signal circuit, a servo signal processing circuit, and a write signal circuit.

Signals between the HDA 500 and the drive electronics 550 can be carried through a flexible printed cable. A controller 580 can direct a servo controller 560 to control mechanical operations, such as head positioning through the head assembly 520 and rotational speed control through the motor assembly 515. The controller 580 can be one or more IC chips (e.g., a combo chip). The controller 580 can be a microprocessor and a hard disk controller. The drive electronics 550 can also include various interfaces, such as a host-bus interface, and memory devices, such as a read only memory (ROM) for use by a microprocessor, and a random access memory (RAM) for use by a hard disk controller. The hard disk controller can include error correction circuitry.

The HDA 500 and drive electronics 550 can be closed in a sealed container with an integral air filter. For example, the hard disk drive can be assembled using a Winchester assembly. The rotating platter can be driven by a brush-less DC motor, and the rotational frequency can be accurately servo-locked to a crystal reference.

A few embodiments have been described in detail above, and various modifications are possible. Thus, other embodiments may be within the scope of the following claims.

What is claimed is:

1. An apparatus comprising:
    a processor; and
    a memory arranged and configured to cause the processor to perform operations comprising:
    producing symbol sequences of a given length;
    for each symbol sequence,
        generating readback waveforms of preamble-shifted and polarity-reversed versions of the symbol sequence based on a target channel and an encoding scheme specified for a storage medium,
        determining a minimum value of Euclidean distances between the generated readback waveforms and a readback waveform of the symbol sequence; and
    selecting one of the symbol sequences having a largest of the determined minimum values as a servo mark for the storage medium.

2. The apparatus of claim 1, wherein the storage medium comprises a magnetic storage medium, and the encoding scheme comprises a 1/N rate Manchester code, N being an integer greater than or equal to 2.

3. The apparatus of claim 1, wherein the servo mark comprises a servo address mark.

4. The apparatus of claim 3, the operations further comprising deciding a servo index mark based on the servo address mark, and based on preamble-shifted and polarity-reversed versions of possible symbol sequences for the servo index mark.

5. The apparatus of claim 4, wherein the servo index mark and the servo address mark both have the given length, and deciding the servo index mark comprises:
    for each of the produced symbol sequences, excluding the selected servo address mark symbol sequence, ascertaining a minimum value of Euclidean distances between the readback waveform of the produced symbol sequence and the generated, preamble-shifted and polarity-reversed readback waveforms for both the produced symbol sequence under consideration and the selected servo address mark symbol sequence; and
    selecting one of the produced symbol sequences, excluding the selected servo address mark symbol sequence, having a largest of the ascertained minimum values as the servo index mark.

6. An apparatus comprising:
    means for producing symbol sequences of a given length;
    means for generating and determining for each symbol sequence, said means for generating and determining including means for generating readback waveforms of preamble-shifted and polarity-reversed versions of the symbol sequence based on a target channel and an encoding scheme specified for a storage medium, and means for determining a minimum value of Euclidean distances between the generated readback waveforms and a readback waveform of the symbol sequence; and
    means for selecting one of the symbol sequences having a largest of the determined minimum values as a servo mark for the storage medium.

7. The apparatus of claim 6, wherein the storage medium comprises a magnetic storage medium, and the encoding scheme comprises a 1/N rate Manchester code, N being an integer greater than or equal to 2.

8. The apparatus of claim 6, wherein the servo mark comprises a servo address mark.

9. The apparatus of claim 8, further comprising means for deciding a servo index mark based on the servo address mark, and based on preamble-shifted and polarity-reversed versions of possible symbol sequences for the servo index mark.

10. The apparatus of claim 9, wherein the servo index mark and the servo address mark both have the given length, and the means for deciding the servo index mark comprises:
    means for ascertaining, for each of the produced symbol sequences, excluding the selected servo address mark symbol sequence, a minimum value of Euclidean distances between the readback waveform of the produced symbol sequence and the generated, preamble-shifted and polarity-reversed readback waveforms for both the produced symbol sequence under consideration and the selected servo address mark symbol sequence; and
    means for selecting one of the produced symbol sequences, excluding the selected servo address mark symbol sequence, having a largest of the ascertained minimum values as the servo index mark.

11. A system comprising:
    a storage medium;
    a processor; and
    a memory arranged and configured to cause the processor to perform operations comprising:
    producing symbol sequences of a given length;
    for each symbol sequence,
        generating readback waveforms of preamble-shifted and polarity-reversed versions of the symbol sequence based on a target channel and an encoding scheme specified for the storage medium, determining a minimum value of Euclidean distances between the generated readback waveforms and a readback waveform of the symbol sequence; and selecting one of the symbol sequences having a largest of the determined minimum values as a servo mark for the storage medium.

12. The system of claim 11, wherein the storage medium comprises a magnetic storage medium, and the encoding scheme comprises a 1/N rate Manchester code, N being an integer greater than or equal to 2.

13. The system of claim 11, wherein the servo mark comprises a servo address mark.

14. The system of claim 13, the operations further comprising deciding a servo index mark based on the servo address mark, and based on preamble-shifted and polarity-reversed versions of possible symbol sequences for the servo index mark.

15. The system of claim 14, wherein the servo index mark and the servo address mark both have the given length, and deciding the servo index mark comprises:

for each of the produced symbol sequences, excluding the selected servo address mark symbol sequence, ascertaining a minimum value of Euclidean distances between the readback waveform of the produced symbol sequence and the generated, preamble-shifted and polarity-reversed readback waveforms for both the produced symbol sequence under consideration and the selected servo address mark symbol sequence; and selecting one of the produced symbol sequences, excluding the selected servo address mark symbol sequence, having a largest of the ascertained minimum values as the servo index mark.

16. A system comprising:

means for storing data;

means for producing symbol sequences of a given length;

means for generating and determining for each symbol sequence, said means for generating and determining including means for generating readback waveforms of preamble-shifted and polarity-reversed versions of the symbol sequence based on a target channel and an encoding scheme specified for the means for storing data, and means for determining a minimum value of Euclidean distances between the generated readback waveforms and a readback waveform of the symbol sequence; and means for selecting one of the symbol sequences having a largest of the determined minimum values as a servo mark for the means for storing data.

17. The system of claim 16, wherein the means for storing data comprises magnetic means for storing data, and the encoding scheme comprises a 1/N rate Manchester code, N being an integer greater than or equal to 2.

18. The system of claim 16, wherein the servo mark comprises a servo address mark.

19. The system of claim 18, further comprising means for deciding a servo index mark based on the servo address mark, and based on preamble-shifted and polarity-reversed versions of possible symbol sequences for the servo index mark.

20. The system of claim 19, wherein the servo index mark and the servo address mark both have the given length, and the means for deciding the servo index mark comprises:

means for ascertaining, for each of the produced symbol sequences, excluding the selected servo address mark symbol sequence, a minimum value of Euclidean distances between the readback waveform of the produced symbol sequence and the generated, preamble-shifted and polarity-reversed readback waveforms for both the produced symbol sequence under consideration and the selected servo address mark symbol sequence; and means for selecting one of the produced symbol sequences, excluding the selected servo address mark symbol sequence, having a largest of the ascertained minimum values as the servo index mark.

21. A method comprising:

producing symbol sequences of a given length;

for each symbol sequence, generating readback waveforms of preamble-shifted and polarity-reversed versions of the symbol sequence based on a target channel and an encoding scheme specified for a storage medium, determining a minimum value of Euclidean distances between the generated readback waveforms and a readback waveform of the symbol sequence; and selecting one of the symbol sequences having a largest of the determined minimum values as a servo mark for the storage medium.

22. The method of claim 21, wherein the storage medium comprises a magnetic storage medium, and the encoding scheme comprises a 1/N rate Manchester code, N being an integer greater than or equal to 2.

23. The method of claim 21, wherein the servo mark comprises a servo address mark.

24. The method of claim 23, further comprising deciding a servo index mark based on the servo address mark, and based on preamble-shifted and polarity-reversed versions of possible symbol sequences for the servo index mark.

25. The method of claim 24, wherein the servo index mark and the servo address mark both have the given length, and deciding the servo index mark comprises:

for each of the produced symbol sequences, excluding the selected servo address mark symbol sequence, ascertaining a minimum value of Euclidean distances between the readback waveform of the produced symbol sequence and the generated, preamble-shifted and polarity-reversed readback waveforms for both the produced symbol sequence under consideration and the selected servo address mark symbol sequence; and selecting one of the produced symbol sequences, excluding the selected servo address mark symbol sequence, having a largest of the ascertained minimum values as the servo index mark.

26. A computer-readable medium, encoded with a software program operable to cause one or more machines to perform operations comprising:

producing symbol sequences of a given length;

for each symbol sequence, generating readback waveforms of preamble-shifted and polarity-reversed versions of the symbol sequence based on a target channel and an encoding scheme specified for a storage medium, determining a minimum value of Euclidean distances between the generated readback waveforms and a readback waveform of the symbol sequence; and selecting one of the symbol sequences having a largest of the determined minimum values as a servo mark for the storage medium.

27. The computer-readable medium of claim 26, wherein the storage medium comprises a magnetic storage medium, and the encoding scheme comprises a 1/N rate Manchester code, N being an integer greater than or equal to 2.

28. The computer-readable medium of claim 26, wherein the servo mark comprises a servo address mark.

29. The computer-readable medium of claim 28, the operations further comprising deciding a servo index mark based on the servo address mark, and based on preamble-shifted and polarity-reversed versions of possible symbol sequences for the servo index mark.

30. The computer-readable medium of claim 29, wherein the servo index mark and the servo address mark both have the given length, and deciding the servo index mark comprises:
for each of the produced symbol sequences, excluding the selected servo address mark symbol sequence, ascertaining a minimum value of Euclidean distances between the readback waveform of the produced symbol sequence and the generated, preamble-shifted and polarity-reversed readback waveforms for both the produced symbol sequence under consideration and the selected servo address mark symbol sequence; and selecting one of the produced symbol sequences, excluding the selected servo address mark symbol sequence, having a largest of the ascertained minimum values as the servo index mark.

* * * * *